March 19, 1935.  E. G. KINGSTON  1,994,651
VERNIER ADJUSTING CONTROL UNIT
Original Filed Jan. 30, 1933  3 Sheets-Sheet 1
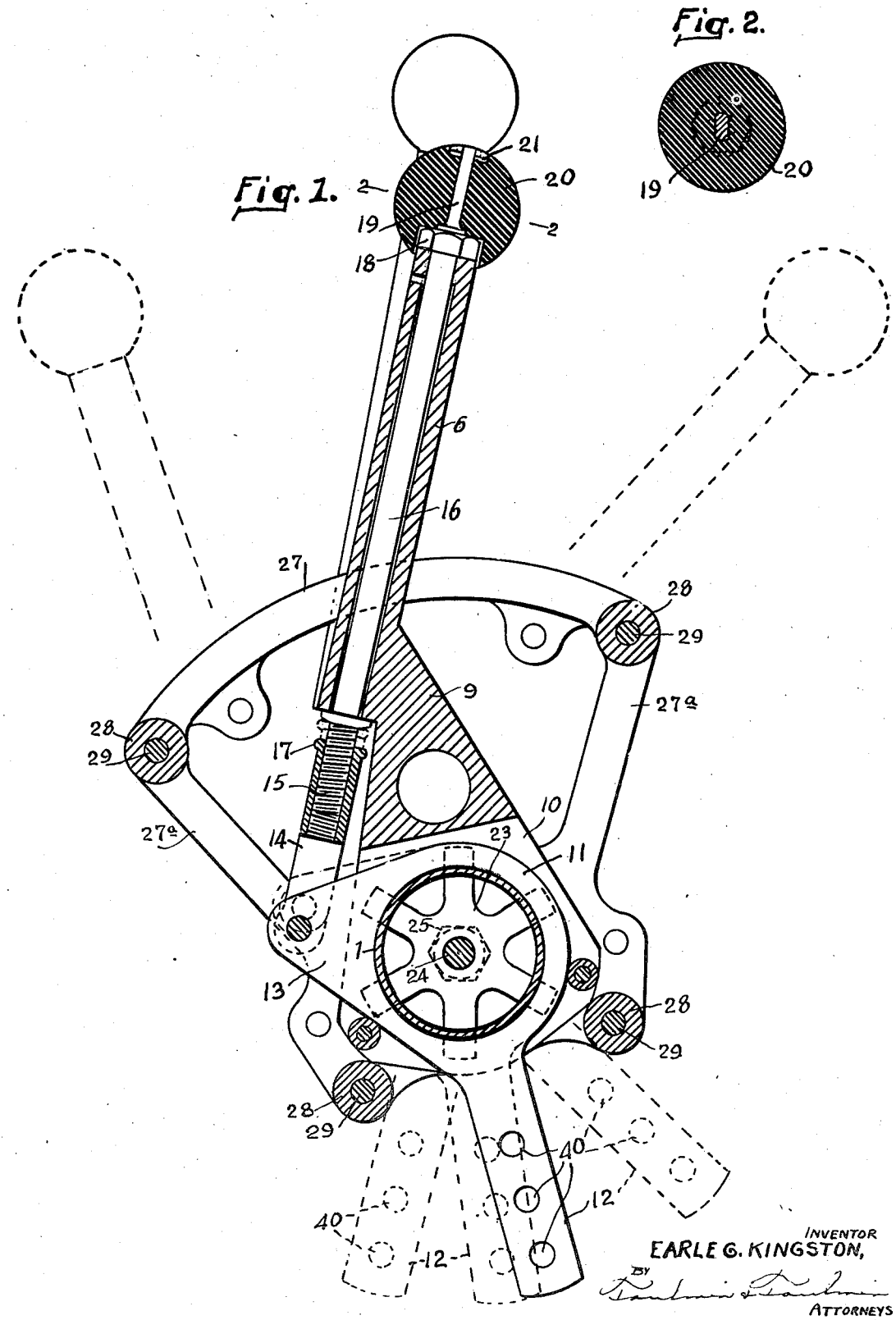
INVENTOR
EARLE G. KINGSTON,
BY
ATTORNEYS March 19, 1935. E. G. KINGSTON 1,994,651
VERNIER ADJUSTING CONTROL UNIT
Original Filed Jan. 30, 1933 3 Sheets-Sheet 2
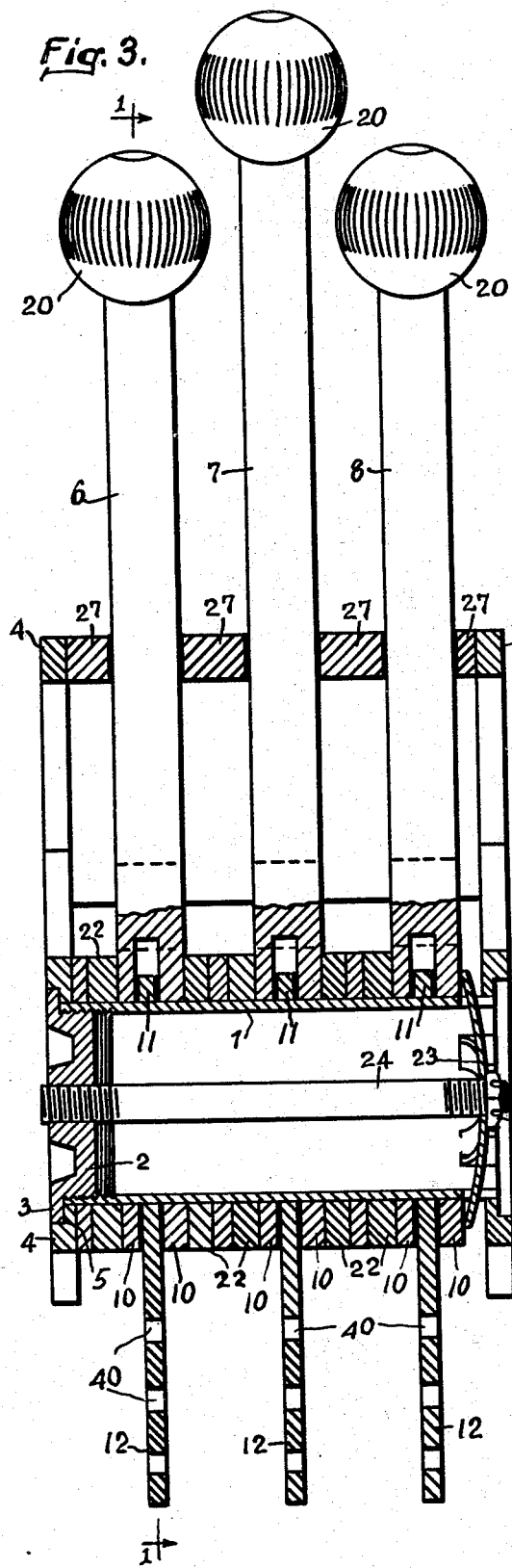
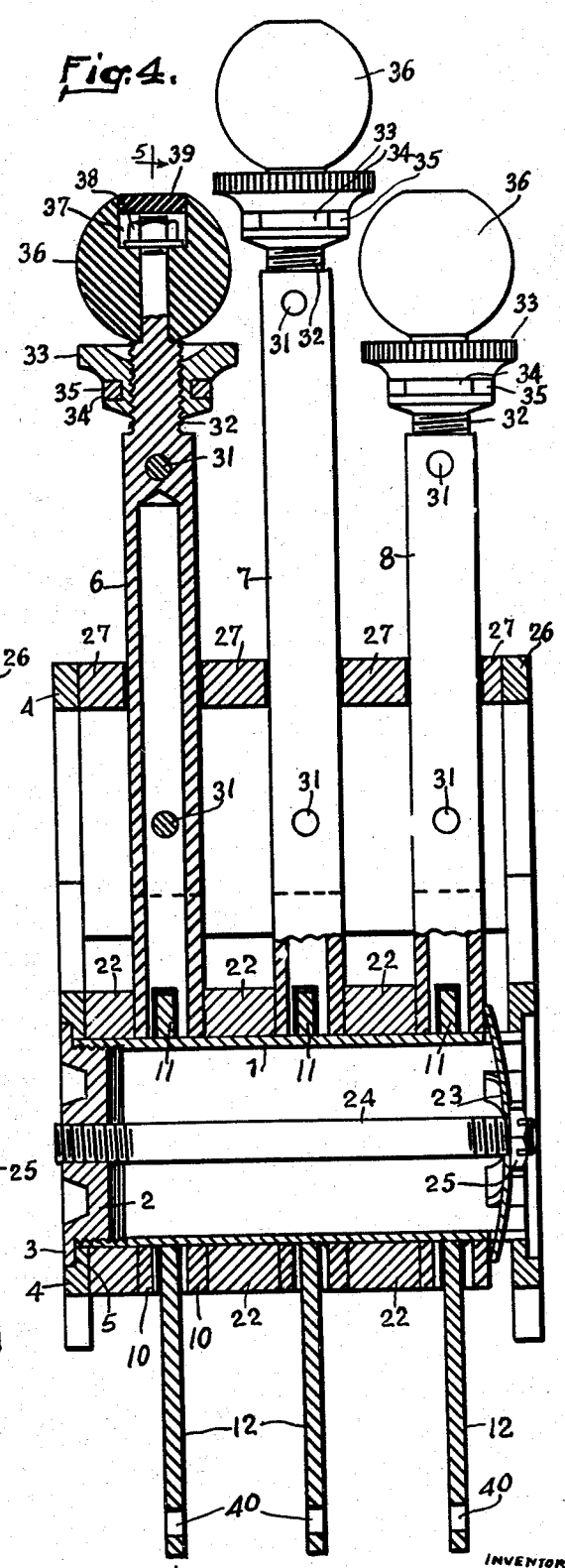
INVENTOR
EARLE G. KINGSTON
ATTORNEYS

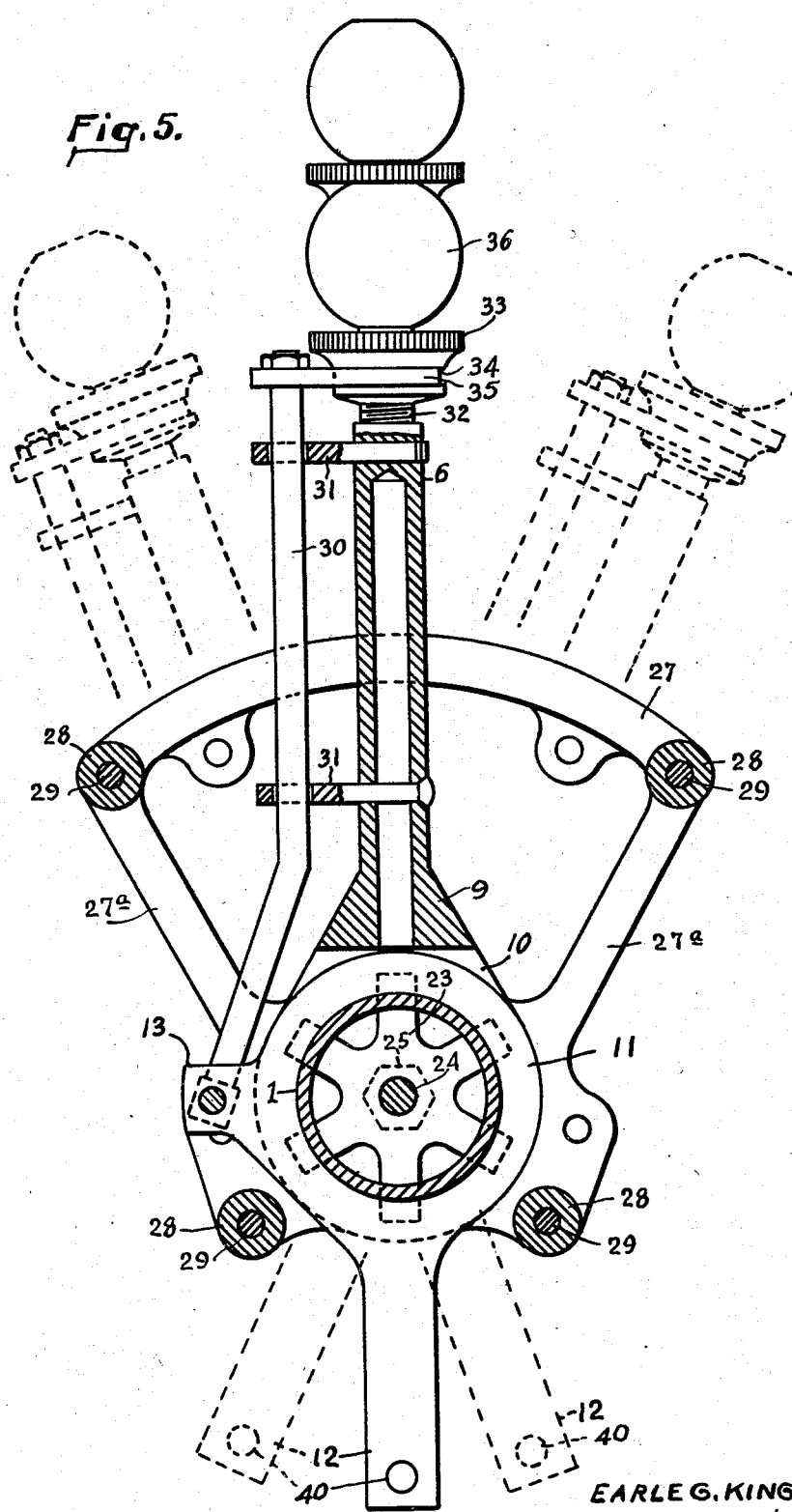

Patented Mar. 19, 1935

1,994,651

UNITED STATES PATENT OFFICE 1,994,651

VERNIER ADJUSTING CONTROL UNIT

Earle G. Kingston, Dundalk, Md., assignor, by mesne assignments, to North American Aviation, Inc., a corporation of Delaware Original application January 30, 1933, Serial No. 654,237. Divided and this application September 5, 1933, Serial No. 688,094

8 Claims. (Cl. 74—531)

This invention relates to improvements in control units, and has for its object to provide a control unit for general purposes, but particularly adapted to be used in connection with airplanes for moving and controlling the various structures thereof.

It is particularly the object of this invention to provide a control unit which has a major adjustment and a minor micrometer adjustment co-operating with the major adjustment.

It is an object of this invention to provide, in connection with an adjustable element, means for giving said element a coarse adjustment, and means connecting said element with said means for giving the adjustable element a fine adjustment.

These and other objects and advantages will appear from the following description taken in connection with the drawings.

This is a division of my copending application, Ser. No. 654,237, filed January 30, 1933.

Referring to the drawings:

Figure 1 is a section on the line 1—1 of Figure 3.

Figure 2 is a section on the line 2—2 of Figure 1.

Figure 3 is a side elevation of one form of vernier adjustment in which the hub and the adjacent structure are shown in section.

Figure 4 shows a modified form of control unit, with one of the levers, the supporting hub and the adjacent structure shown in section.

Figure 5 is a section on the line 5—5 of Figure 4.

In the forms shown in Figures 1 and 3 the supporting frame carries a hub 1, which has threaded in one end a retainer disc 2 provided with a peripheral flange 3. The supporting frame includes a plate 4 which surrounds the hub adjacent the flange. The plate has therein a seat 5 for receiving and seating the peripheral flange 3.

Mounted upon the hub and rotatably supported thereby is a plurality of levers 6, 7 and 8, in the present instance. However, the number of levers may be varied to suit the demands and requirements. One end of each lever has an enlargement 9, which is divided into two spaced parallel arms 10, each of which has therein a hole for receiving the hub 1. Between these two arms and fitting around the hub is a plate 11, which has extending therefrom two arms, one 12 and the other 13. To the arm 13 is pivoted one end of a clevis 14. The other end of the clevis is hollow and receives a threaded end 15 of a rod 16, which extends through a hole provided therefor in the lever.

On this rod is a shoulder 17 which is adapted to engage the lower end of the hollow part of the lever to prevent the upward movement of the rod with relation to the lever. On the end of the rod remote from the threaded end and the shoulder is a nut 18 which limits the downward movement of the rod in the lever. This nut is adjacent the upper end but spaced therefrom so there is provided an upper part 19 of the rod, which is flat and has thereon a head 20 by which the rod may be rotated for moving the clevis longitudinally and thereby rotating the plate. The head is held upon the upper end of the rod by means of a pin 21.

In order to properly space the levers with relation to each other and with relation to the frame part of the structure a plurality of spacers 22 is provided around the hub. At the end of the hub, remote from the disc 2, is a spring 23 which is mounted upon one end of a bolt or shaft 24 threaded at one end in the disc 2 and having its other end threaded and passing through the spring 23 and engaged by a nut 25. By means of this nut the spring is forced into engagement with a lever, such as the lever 8 shown in Figure 3, or some other adjacent structure.

Cooperating with the plate 4 to form the frame is a plate 26. These plates 4 and 26 and sectors 27 are connected to the part of the frame or to the spacers 22 by means of arms 27a. The sectors 27 are held in spaced relationship by means of spacers 28, and are held together and to the plates 4 and 26 by means of bolts 29.

In the form of Figure 5 there is shown a similar hub structure with a lever mounted thereon together with a plate beneath the bifurcated end of the lever, but instead of having a bolt extending through the lever for rotating the plate upon the hub there is provided a rod 30 connected at one end to the arm 13 and extending through holes provided in guides 31 attached to the lever.

Threaded into the upper end of the lever is a threaded stem 32, which has thereon a vernier wheel 33 by which the stem may be rotated in the upper end of the lever. This vernier wheel is provided with a circular slot 34, which receives one end of a yoke 35 attached to the other end of the rod 30. The rotation of the vernier wheel will cause the yoke to move longitudinally with regard to the lever and carry with it the rod 30. The movement of the rod 30 longitudinally will cause the plate 13 to rotate about the hub.

Suitably attached to the vernier wheel is a ball 36 to be gripped by the hand for manipulating the lever. In the upper end of this ball there is a recess 37, adapted to receive a nut 38 threaded on the upper reduced end of the lever for the purpose of holding the ball or knob on the lever. The recess is closed by means of a closure 39, which fits over the nut 38. The arms 12 are provided with holes 40, by means of which the arms may be adjustably connected to some object to be adjusted. These holes may be arranged at different points from the center of rotation of the arms so as to vary the leverage.

In each of the forms shown in the drawings the coarse adjustment is made by manipulation of the levers. After this adjustment has been made a finer adjustment is made in the form shown in Figure 1 by rotating the head 20 to rotate the rod and to move the clevis longitudinally, thereby rotating the plate.

In the form shown in Figure 5 the rotation of the head will cause the vernier wheel to move longitudinally of the lever and carry with it the rod 30, which does not rotate but moves longitudinally. The longitudinal movement of the rod 30 will cause the plate to rotate, and thereby shift the arm 13.

It will be understood that I desire to comprehend within my invention such modifications as come within the scope of my claims and my invention.

Having thus fully described my invention, what I claim as new and desire to secure by Letters Patent, is:

1. In a control unit, a frame having a hub, a plurality of hollow levers, each lever being bifurcated at one end to form spaced arms with holes therein to receive the hub, a plate for each lever mounted on the hub between the arms, and longitudinally movable means on each lever forming a connection between each plate and its lever, and means rotatably mounted in each lever for moving said means longitudinally; whereby the plate may be rotated on the hub by moving the lever and may be rotated on the hub independent of any movement of the lever.

2. In a control unit, a frame having a hub, a plurality of levers, each lever being bifurcated at one end to form spaced arms with holes therein to receive the hub, a plate for each lever mounted on the hub between the arms, and a connection between each plate and its lever, whereby the plate may be rotated on the hub independent of any movement of the lever, said connection comprising a clevis connected at one end to the plate, a rod threaded at one end into the clevis and rotatably supported by the lever, and means on the other end of the rod for rotating the rod.

3. In a control unit, a frame having a hub, a lever having one end bifurcated to form spaced arms with holes therein to receive the hub, a plate having a hole therein to receive the hub mounted on the hub between the arms, a pair of arms on the plate, longitudinally movable means on the lever connecting the lever to one plate arm for rotating the plate by moving the lever, said means comprising a clevis attached to the arm and a rod rotatably mounted on the lever and threaded into the clevis operable to rotate the plate independent of any movement of the lever.

4. In a control unit, a frame having a hub, a hollow lever having a large end bifurcated to form spaced arms with holes therein to receive the hub, a plate having a hole therein to receive the hub, mounted on the hub between the arms, a pair of arms on the plate, a clevis pivoted at one end to one plate arm, a rod mounted in the lever and connected at one end to the clevis, and means connecting the rod to the lever, whereby the plate may be rotated by moving the lever or by the rod independent of any movement of the lever.

5. In a control unit, a quadrant frame, a supporting shaft, a lever mounted on said shaft comprising a vertically disposed portion and a diagonally disposed portion, a second lever mounted on said shaft comprising a pair of angularly disposed arms, and means connected to one of said arms and adjustably carried by the diagonally disposed portion of the lever for adjusting the relationship between said arms and said lever.

6. In a control unit, a quadrant frame, a supporting shaft, a lever mounted on said shaft comprising a vertically disposed portion and a diagonally disposed portion, a second lever mounted on said shaft comprising a pair of angularly disposed arms, and means connected to one of said arms and adjustably carried by the diagonally disposed portion of the lever for adjusting the relationship between said arms and said lever, said means comprising a rotatable adjusting screw and means for actuating said screw mounted on the head of said diagonally disposed portion of the lever.

7. In combination, a quadrant, a lever pivotally mounted on said quadrant comprising a vertically disposed portion and an angularly disposed sleeve, a rotatable rod mounted in said sleeve having an actuating head thereon mounted on the end of the sleeve portion of said lever, an angularly disposed lever pivoted with respect to the first-mentioned lever, and means connecting the rod and said sleeve to a portion of the second lever whereby it may be adjusted with respect to the first-mentioned lever as to the angular position therebetween and may be bodily moved with the first-mentioned lever in its adjusted position.

8. In a quadrant, means for pivotally supporting a lever having a vertically disposed portion and an angularly disposed sleeve, an adjustable rod in said sleeve projecting out of either end thereof, means on the upper end for rotating the rod, a screw sleeve on the lower end outside of the lever sleeve, a second lever mounted on the same axis and the quadrant as the first lever connected to said screw sleeve whereby the relationship between the levers may be adjusted and both levers may be moved together by the actuation of one when so adjusted with respect to one another.

EARLE G. KINGSTON.